(12) United States Patent
Bou-Diab

(10) Patent No.: US 7,797,382 B2
(45) Date of Patent: Sep. 14, 2010

(54) VIRTUAL PRIVATE NETWORK PUBLISH-SUBSCRIBE MULTICAST SERVICE

(75) Inventor: Bashar Said Bou-Diab, Ottawa (CA)

(73) Assignee: Alcatel Lucent, Paris (FR)

( * ) Notice: Subject to any disclaimer, the term of this patent is extended or adjusted under 35 U.S.C. 154(b) by 1320 days.

(21) Appl. No.: 11/292,346

(22) Filed: Dec. 2, 2005

(65) Prior Publication Data

US 2007/0204339 A1 Aug. 30, 2007

(51) Int. Cl.
G06F 15/16 (2006.01)
(52) U.S. Cl. .................. 709/204; 709/207; 370/390; 370/395.53; 370/404; 370/406
(58) Field of Classification Search .......... 709/207; 370/390, 395.53, 404, 406
See application file for complete search history.

(56) References Cited

U.S. PATENT DOCUMENTS

| 7,467,215 | B2 * | 12/2008 | Ould-Brahim | 709/230 |
| 7,568,220 | B2 * | 7/2009 | Burshan | 726/4 |
| 2003/0016679 | A1 * | 1/2003 | Adams et al. | 370/401 |
| 2003/0110268 | A1 * | 6/2003 | Kermarec et al. | 709/227 |
| 2003/0154259 | A1 * | 8/2003 | Lamberton et al. | 709/213 |
| 2003/0154404 | A1 * | 8/2003 | Beadles et al. | 713/201 |
| 2004/0078424 | A1 * | 4/2004 | Yairi et al. | 709/203 |
| 2004/0230664 | A1 * | 11/2004 | Bowers et al. | 709/208 |
| 2007/0076709 | A1 * | 4/2007 | Mattson et al. | 370/389 |

FOREIGN PATENT DOCUMENTS

EP 1 713 231 10/2006

OTHER PUBLICATIONS

Christele Bouchat et al.,"Qos in DSL Access", IEEE Communications Magazine, Sep. 2003, pp. 108-114, vol. 41, No. 9.
William Fenner et al., XTreeNet: Scalable Overlay Networks for XML Content Dissemination and Querying (Synopsis), Web Content Caching and Distribution, Sep. 12, 2005, pp. 41-46.
"Sarvega XML Context Router Enables Web Services Over WANs", Grid Today/Internet, Jun. 28, 2004, pp. 1-2.
Tarek Saad et al., Inter-VLAN VPNs over a High Performance Optical Testbed, Testbeds and Research Infrastructures for the Development of Networks and Communities, Feb. 23, 2005.
Rosen, et al., Multicast inMPLS/BGP IP VPNs, Network Working Group Internet Draft Memo, May 2004, Cisco Systems, Inc.

* cited by examiner

*Primary Examiner*—Thu Nguyen
*Assistant Examiner*—Tauqir Hussain
(74) *Attorney, Agent, or Firm*—Kramer & Amado P.C.

(57) ABSTRACT

Publish-subscribe XML multicast service within a VPN service is described. A backbone such as an IP/MPLS backbone connects multiple subscriber sites using VPN technology and VPN edge routers. XML publish-subscribe modules are addressable within the VPN and form an overlay network between the edge routers participating in the VPN. The XML publish-subscribe modules may perform either topic-based multicast or content-based multicast services. The multicast service is self-managed.

20 Claims, 3 Drawing Sheets

VIRTUAL PRIVATE NETWORK PUBLISH-SUBSCRIBE MULTICAST SERVICE

FIELD OF THE INVENTION

This invention relates to Virtual Private Network (VPN) Multicast services and more particularly to XML-based, publish-subscribe communications within VPN Multicast services.

BACKGROUND

The present invention integrates VPN multicast services and XML publish-subscribe communications in a common architecture. This combination allows self-managed, zero-configuration, multicast service for XML-based applications in a VPN environment.

Virtual Private Network (VPN) service is concerned with connectivity between disparately connected LANs over a carrier's network. There are many versions of VPN technologies that connect Local Area Networks (LAN) at different communication layers: Virtual Private LAN Service (VPLS) for connecting LANs at layer 2 of the OSI stack; Routed VPN for connecting LANs at layer 3; and SSL VPN for connecting hosts to servers at layer 4. Publish-subscribe multicast mechanisms described herein may work with any of the VPN technologies and be offered as an added-value service to the VPN service.

Multicast is concerned with content delivery from one or more sources to multiple destinations. Packets of multicast traffic, which are identified by multicast channels, are delivered from one or multiple sources to multiple destinations. Some Internet Service Providers (ISPs) offer VPN multicast services with layer 3 VPN service. These ISPs use IP multicast technology and either static IP multicast routing or variants of the Protocol Independent Multicast (PIM) or Multicast Open Shortest Path First (M-OSPPF) protocols, or other multicast routing protocols to enable multicast connectivity between carrier edge routers that are participating in the VPN service.

Publish-subscribe communication is a messaging model. Messaging is the exchange of messages, such as specially-formatted data describing events, requests, and replies, to a messaging server, which acts as a message exchange program for clients' programs. In publish-subscribe technology, subscribers register their interests in a topic or a pattern of events and then asynchronously receive events matching their interest from the messaging server, regardless of the events' publisher. The strength of an event-based interaction style is drawn from full decoupling in time, space and flow between publishers and subscribers. Sun Microsystems' Java Message Service (JMS) is an example of a product that provides messaging interfaces and services using a publish-subscribe communication model.

XML Publish-Subscribe routing uses XML as the data model and follows a publish-subscribe content delivery mechanism where a subscriber (client) requests content relating to a specific context (XML document constraint), the network stores context subscriptions (XML document constraint to interface(s) mapping entries), the publisher (server) pushes content to the network, and the network delivers the content based on contexts' subscriptions to the subscribers. XML routed communication involves forwarding an XML document based on the contents of the document and the subscription databases in the XML routers. Originators and receivers need not know about each other nor is a connection needed between an originator and a receiver. Using XML routing, receivers declare their interests using the subscribe process, originators simply publish messages, and the network takes care of delivering the messages from the senders to the receivers. At a high level, XML routed communication realizes a many-to-many push communication facility that uses dynamic XML content addresses (the content is an interface group address) and decouples sources (subscribers) from receivers (publishers) with a network of XML routers.

XML-based networking in general and XML Publish-Subscribe routing in particular relies on logical XML document constraints, such as topic constraints or attribute value pair constraints, to make policy, routing, and data transformation decisions for a given XML document. A unique characteristic of a XML document is the augmenting of data with semantic and structural information in a flexible manner defined by the application. An XML document is a set of typed attributes (XML elements). The semantic and structural information in an XML document are used as basis for content-based communication in a XML-aware network as they allow value and structural constraints.

XML publish-subscribe routing is not enough to enable publish-subscribe communication between different parties. Publishers, subscribers, and XML routers need a common framework for referencing XML document constraints. XML schemas provide a way to define the structure, content and semantics of XML documents for a particular industry or set of tasks. To access a publication that is based on a specific XML schema, subscribers need to use the same XML schema to express subscriptions using XPath or XQuery. XML schemas have been developed for several document distribution systems, WS-Notification being a good example.

The following is an example of a XML Router Forwarding Table:

| XPath Constraint/Predicate | Next Hop Resource Set |
|---|---|
| /music/cd[ @artist = "Celine"] | {URI1, URI3, URI4, URI9, URI15} |
| //ticker/symbol/[symbol = "ALA"] | {URI4, URI2, URI3} |

With the rapid adoption of eXtensible Markup Language (XML) and the advent of XPath, XQuery, and related technologies, publish-subscribe systems have gained attention for their potential as application-independent application-level XML multicast routers. XML is a flexible way to create common information formats and share both the format and the form data on the World Wide Web, intranets, and elsewhere. XPath is a language that describes a way to locate and process items in XML documents by using an addressing syntax based on a path through the document's logical structure or hierarchy. XQuery is a specification for a query language that allows a user or programmer to extract information from an XML file or any collection of data that can be XML-like. A publish-subscribe messaging server that uses XPath and XQuery technologies allow for real-time, asynchronous group communication between clients. XML publish-subscribe systems have recently emerged as content-aware XML service routers. Examples of these XML service routers are Solace Systems XCR 3200 and Sarvega's XML Context Router. These XML Publish-Subscribe systems also provide self-managing XML multicast.

VPN Multicast services are operationally complex and do not allow for automatic creation and destruction of multicast groups. One approach, currently offered by some networking vendors, is described in a publication entitled draft-rosen-vpn-mcast-07.txt. The approach described therein requires network operators to operate complex multicast routing protocols and LAN administrators to perform complex configuration and assignment of the IP multicast address space. This approach is not suitable for applications where channels need to be created and destroyed automatically and frequently without configuration of the multicast applications.

There are indeed, a number of applications that require multicast self-management. These include Independent/Personal broadcast, Supply Chain asset tracking, real-time DB access, application content synchronization, custom data push, and location based notifications.

PRIOR ART

There appears not to be any prior art relating to XML publish-subscribe as a value added XML multicast within a VPN service.

The closest prior art of which the Inventor is aware of consists of XML Publish-Subscribe routers and messaging servers. These routers have been deployed in a LAN to provide asynchronous messaging, data transformation, and multicast capabilities. XML Publish-Subscribe routers can offer XML multicast in a LAN environment with all the benefits of publish-subscribe multicast such as "self-management", which is about automatic channel creation in an unlimited channel space. However without the participation of VPN edge nodes in message replication, duplicate messages need to be sent from one site to subscribers in multiple other sites that are part of the corporate VPN. Sending duplicated messages to various sites over the network access link, which is usually an expensive DS1 or a T1, constitutes inefficient use of the network access link. Inefficient use of the VPN attachment circuit bandwidth is a problem outlined in typical scenarios where the network access link is the communication bottleneck in a VPN.

Other prior art relates to IP multicast VPN services. The most popular approach is a solution offered by Cisco Systems and Juniper Networks for PIM-based multicast within a layer 3 BGP/MPLS VPN and is described in the aforementioned: draft-rosen-vpn-mcast-07.txt. IP multicast services in a VPN provide packet replication at the VPN network edges to avoid inefficient use of the VPN access link, also known as "attachment circuit". However IP multicast in a VPN environment requires complex operations of multicast routing protocols and complex configuration and assignment of the IP multicast address space. The IP multicast VPN service is suitable for group communication when channels are fairly static, such as Broadcast Digital TV applications. However IP VPN multicast is not suitable for applications where channels need to be created and destroyed automatically and frequently without configuration effort. Applications that require multicast self-management, as discussed previously, include webcasting, personal broadcast, Supply Chain asset tracking, sensor data monitoring, real-time DB and application synchronization, custom data push, and location based notification applications.

SUMMARY OF THE INVENTION

The present invention seeks to complement carrier based VPN services with XML publish-subscribe multicast technology to deliver advanced multicast services to multiple subscribers within a VPN and to allow automatic creation and destruction of multicast groups.

Therefore in accordance with a first aspect of the present invention there is provided a method of delivering multicast services between multiple customer sites within a virtual private network (VPN) comprising: connecting customer sites to the VPN through VPN edge routers; and overlaying a XML publish-subscribe service on the VPN edge routers, the XML publish-subscribe service being addressable from the customer sites within the VPN.

In accordance with a second aspect of the invention there is provided a system for delivering multicast services to multiple Virtual Private Networks (VPNs), each connecting multiple customer sites over a Virtual Private Network (VPN) comprising: an edge router between each subscriber site and the VPN; and an XML publish-subscribe module associated with each edge router, the modules being addressable within the VPN to form an overlay network.

In accordance with a further aspect there is provided a XML publish-subscribe module for use in an overlay-configured association with an edge router in a VPN for delivery of multicast services between multiple customer sites.

BRIEF DESCRIPTION OF THE DRAWINGS

The invention will now be described in greater detail with reference to the attached drawings wherein.

DETAILED DESCRIPTION OF THE INVENTION

Figure 1:
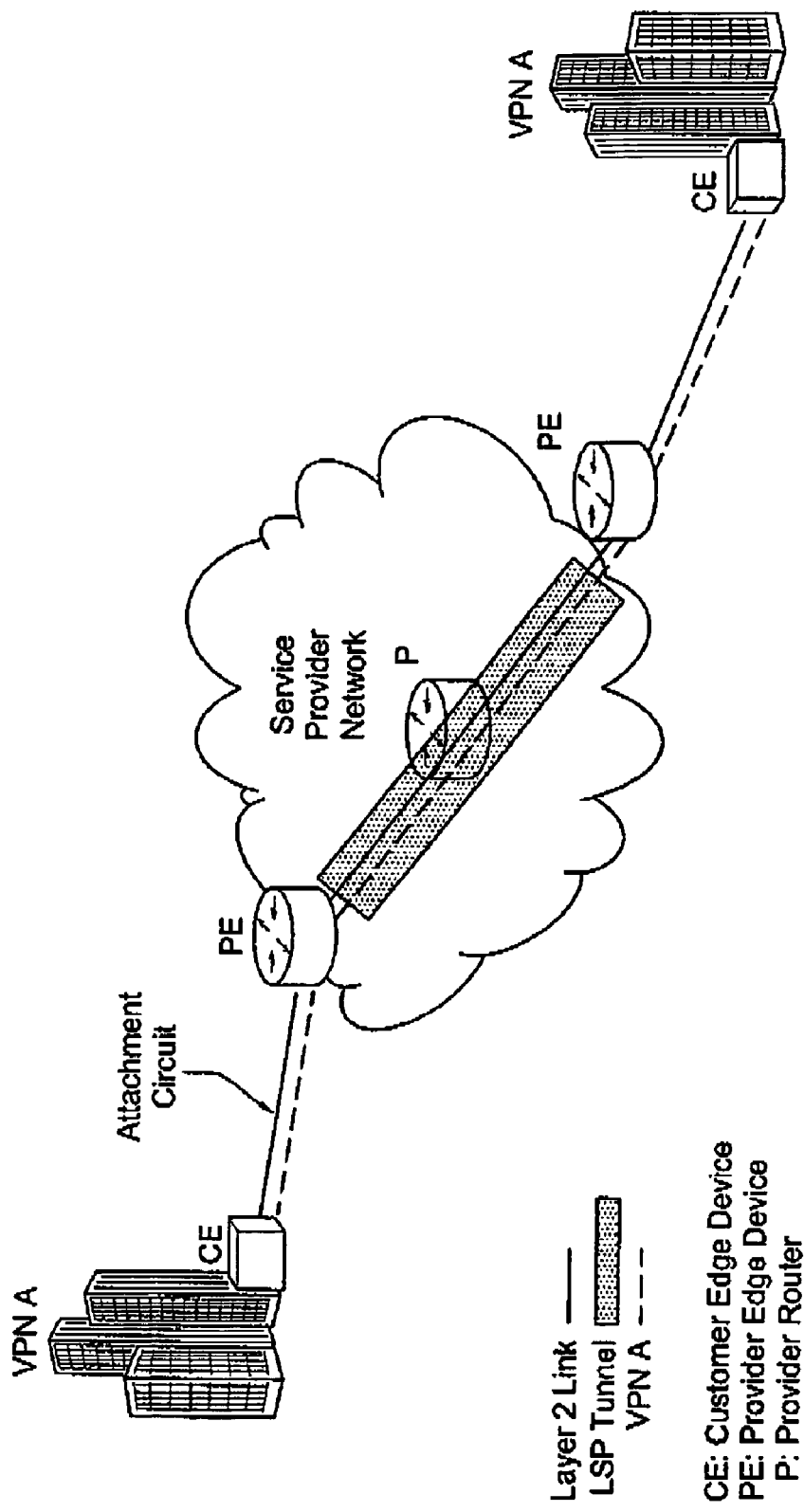
FIG. 1 illustrates a provider provisioned VPN reference model.

FIG. 1 shows a reference model of a provider provisioned VPN defined by the Internet Engineering Task Force (IETF). This model shows how to interconnect two private sites, which are called VPN A in this Figure, over the service provider's public networks. At each site, there is a device, called a Customer Edge (CE) device, which could be a switch or a router at the customers' premises. This device aggregates traffic, and presents it to the network. The CEs are connected to a service provider networks via a layer 2 link, called the Attachment Circuit (AC). The attachment circuit may be a Frame Relay DLCI, an ATM VPI/VCI, an Ethernet port, a VLAN, a PPP connection, an MPLS LSP, for example. The service provider network, which is a public network, could be circuit-switched or packet-switched network(s). It could be an MPLS network, or it could be a Frame Relay network. The provider network comprises routers. Some of these routers are located at the edge of the network to connect to the CEs and to provide special functionality. These edge routers are called Provider Edge (PE) Devices. Other routers are called Provider (P) routers. In FIG. 1, a tunnel is established between two PEs via one or more P routers. Then, the end-to-end traffic of the two sites of the private network (specified by VPN A) is carried over the service provider public network by the tunnel. In summary, the main elements of a VPN are the CE devices, the PE routers, the Attachment Circuit, and the secure tunnel established in provider network.

Figure 2:
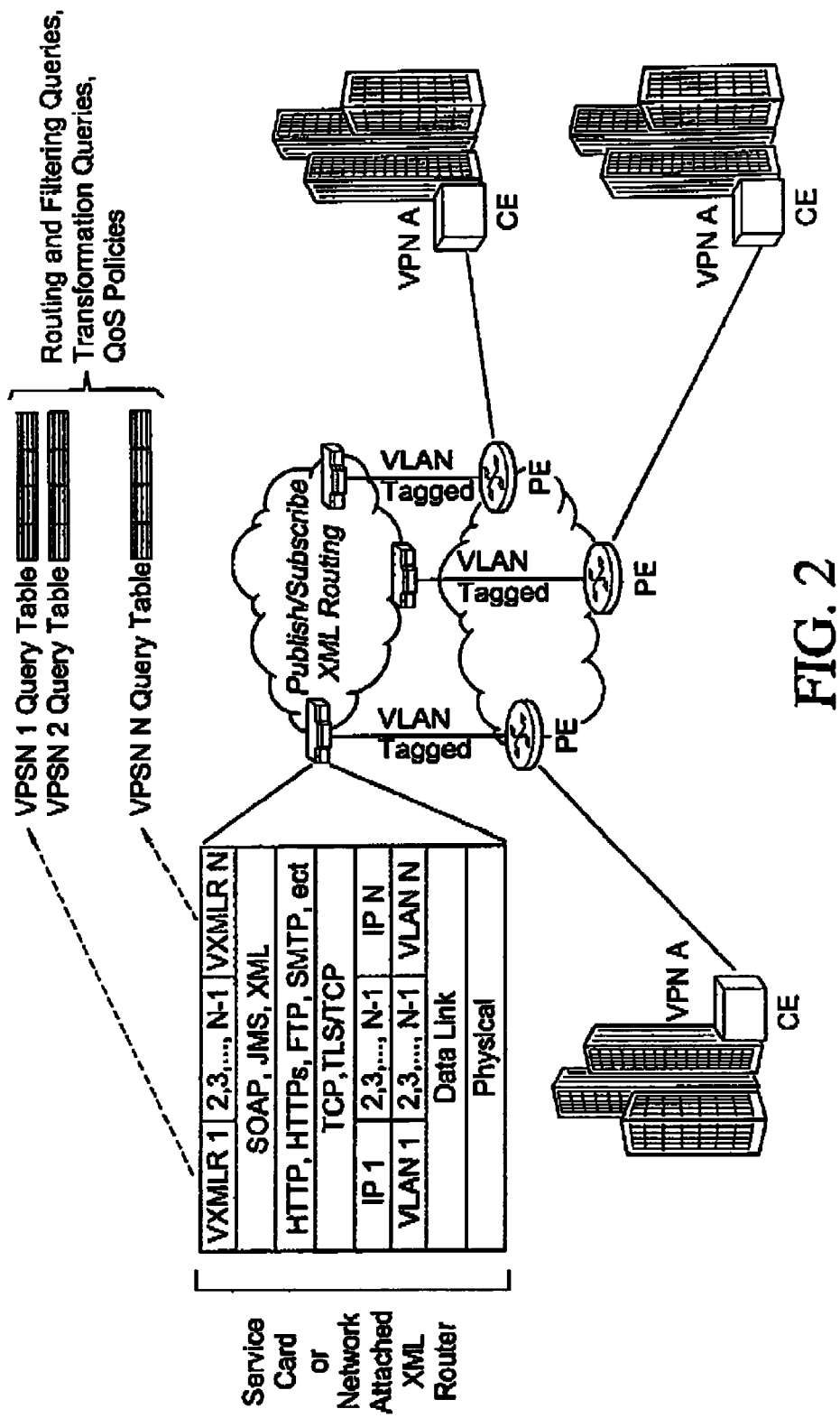
FIG. 2 is a high level description of the XML publish subscribe multicast service architecture of the present invention.

FIG. 2 is a high level diagram of the publish-subscribe multicast service architecture of the present invention. Co-located at a PE is an XML Router that could be either embedded in the PE or connected to the PE with a data link technology such as Ethernet. The XML Router connects to the PE with Virtual Local Area Network (VLAN) tagged Ethernet interfaces over one or more adapters. With multiple VLANs on an adapter, an XML Router with a single adapter can have a logical presence on multiple VPNs. Because of the tagging VLAN capabilities of XML Router and the PE devices, the XML Router is able to communicate on all VPNs crossing the PE, but continues to maintain routing and broadcast separation between the VPNs using Virtual XML Routers (VXMLR). An XML Router implements a number of Virtual XML Routers (VXMLR), each VXMLR handling XML publish-subscribe services within a VPN. A VLAN identifier that is unique within the scope of the XML Router is assigned to each VXMLR for associating each VXMLR with the VPN it serves. Additionally, each VXMLR is assigned one or more IP addresses and a host names that are reachable from within the VPN it serves.

FIG. 2 illustrates the architecture and components which combine to implement the present invention. Multiple sites (1, 2, and 3) of a customer represented as VPN A are illustrated. Each site has representative customer equipment such as application servers, computers, PDA, computer etc. Each site is joined to an edge router through a CE switch or router. Within the network, a VPN is implemented over a backbone such as, an IP/MPLS backbone. The publish-subscribe module (or router) performs XML publish-subscribe multicast functions within multiple carrier-based VPN service while keeping routing and resource isolation between the VPNs. The publish-subscribe modules also include associated Operation, Administration, and Management (OA&M) software. In FIG. 2 an IP/MPLS backbone network is shown connecting three enterprise sites using VPN technology implemented in the edge routers. The XML publish-subscribe multicast modules implement Virtual XML Router (VXMLR) for each VPN they serve and connect the VXMLR to each VPN with a unique logical port such as a VLAN. VXMLRs associated with a VPN are addressable from within each VPN and form an overlay network between the edge routers participating in the VPN.

The XML publish-subscribe (Pub-Sub) modules may be integrated with the edge routers or may be attached using VLAN ports and Ethernet technology. All publish and subscribe service related messages sent from an enterprise site on an attachment circuit that are addressed to the VXMLR of the VPN are forwarded by the PE to the VXMLR over the VLAN ID associated with the VPN. These messages are processed by the VXMLR as typically done on publish-subscribe messaging servers. The VXMLR appear as a typical IP host to the customer premise equipment over the attachment circuits. Relevant messaging standards include Data Dissemination Service (DDS) by the Object Management Group of OASIS, Web Services Notification by W3C, and Java Messaging Services (JMS) by Sun Microsystems. They may also support RSS (Real Simple Syndication) and Asynchronous JavaScript and XML (AJAX) interfaces for VPN Syndication applications and real-time asynchronous customer communications.

An XML Router implements a number of Virtual XML Routers (VXMLR), each VXMLR to handle XML publish-subscribe services within a VPN. A VLAN identifier that is unique within the scope of the XML Router is assigned to each VXMLR for associating each VXMLR with the VPN it serves. Additionally, each VXMLR is assigned one or more IP addresses and a host names that are reachable from within the VPN it serves.

Each VXMLR processes XML queries (Routing and possibly Transformation) within its VPN and constructs its own Virtual Publish-Subscribe Network (VPSN) Query Table for processing XML traffic within the scope of the VPN. Each VXMLR is isolated from the rest of the VXMLRs within the same XML Router in many areas:

Networking: unique VLAN ID, bandwidth per VLAN.
Processes: Each VXMLR has its own processes.
File system: The access of each VXMLR is limited to a subdirectory of a root directory.
Memory space: a separate memory range is assigned to each VXMLR.

There are three possible types of publish-subscribe networks that may be built using XML routing: topic-based publish-subscribe and content-based publish subscribe. In topic-based systems, a message belongs to one of a set of topics (groups or channels). The subscription targets a topic, and the user receives all events that are associated with that topic. Brokering a connection between publishers and subscribers with XML routers is the act of connecting a topic supplier with a topic consumer. For example, in a topic-based system for stock trading, a participant could subscribe, based on the stock name, to all publications related to the stock of interest. In topic-based systems the subscriber would receive all information related to the subscribed topic. On the other hand, content-based publish-subscribe systems are not constrained to the notion that a message must belong to a particular group. The system decides to whom a message is directed by examining each message and matching the message to a potentially complex query specifying structural and predicate constraints issued by a subscriber. Content-based publish-subscribe provides the subscriber just the information he/she needs but burdens the underlying system with matching messages to the subscriptions. The number of unique subscriptions can be orders of magnitude larger than the number of topics that must be managed in the topic-based system.

Figure 3:
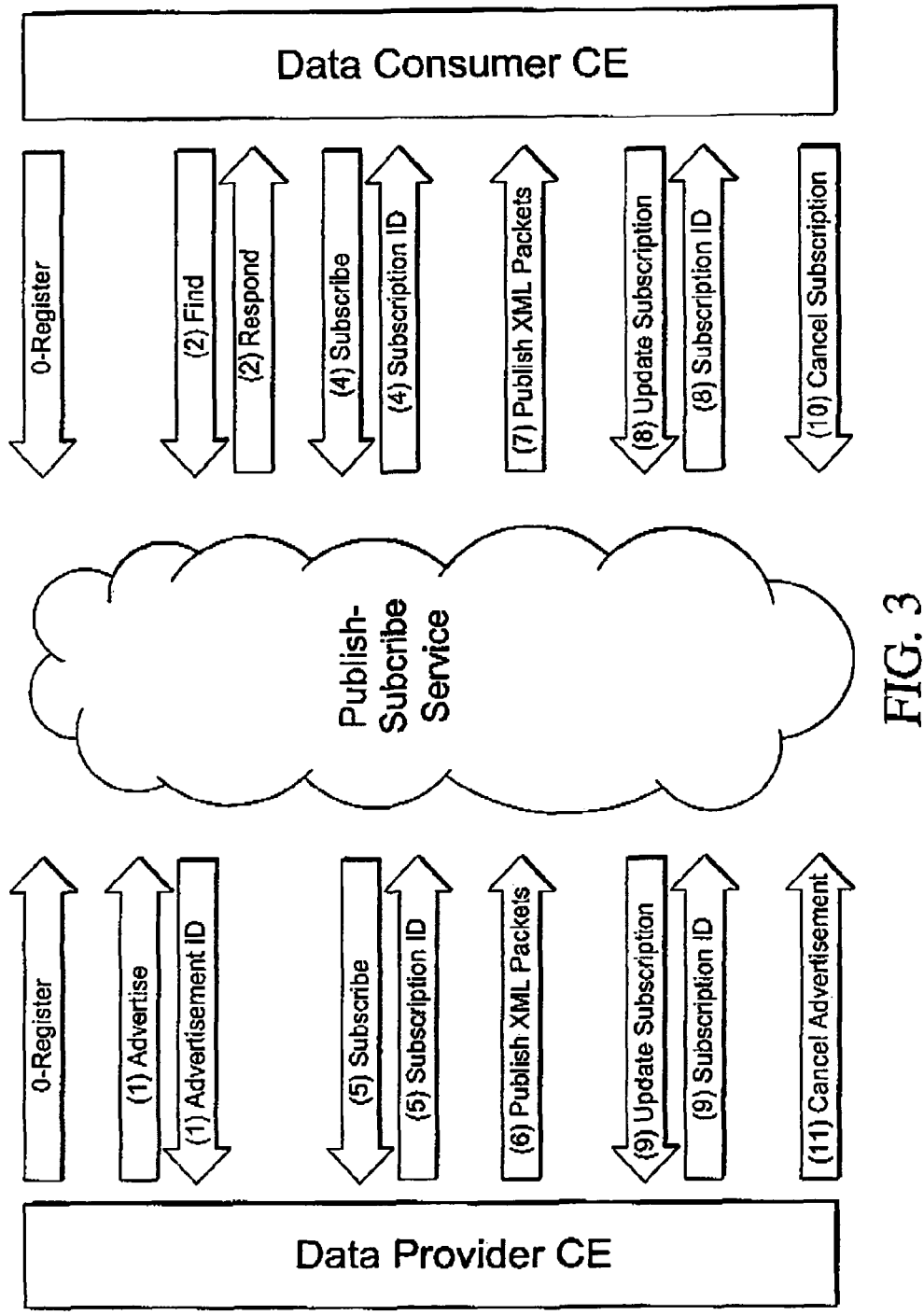
FIG. 3 is an example of publish-subscribe service interaction.

FIG. 3 shows an example of how a customer subscriber or publisher interacts with the publish-subscribe multicast service. The multicast source may advertise a stream description to the VPSN service or cancel an advertised stream description before the advertisement expires. The multicast source may publish the XML stream to the VPSN voluntarily or upon receiving a subscription to the multicast stream. A multicast receiver may issue a search to the VPSN service to find available multicast streams fitting to a specific search criteria. The multicast receiver may subscribe to an XML stream with a topic, predicate, or complex constraint subscription and may cancel the subscription before it expires.

Subscriptions and advertisements (publishing-indication) are the bases of XML publish-subscribe communication since they are used to construct routing information. A XML content subscription is a logical constraint on document structure (path expression) or attribute(s) value(s) requesting XML documents matching these logical constraints to be forwarded to the subscribing node, or on the interface of the subscription. An XML document contains elements, which contain attributes, other elements, and text. XPath and XQuery provide de facto standard languages for expressing XML document subscriptions and a standard expression syntax for locating XML elements within XML documents. At an XML router, the next hops (URIs) of a message are determined by matching the content of the message against logical content constraints in a content routing database. The content routing database is constructed from the subscriptions, each being a set of attribute-value constraints, of the neighbor nodes indicating messages of interest. The XML-routed communication service consists of delivering a message to all XML nodes whose subscription constraints encompass the message attributes.

XML routing is a many-to-many communication facility in nature. Consider a case of identical content subscriptions with a constraint Cx are received at the same XML router from different neighbors. In that case, the subscription database in the router stores one routing entry with XML document constraint Cx that resolves to an URI (Unique Resource Identifier) set Sx. Sx includes many different URIs that connect the router to the neighbors from which identical subscription Cx came from. The forwarding entry R{message: message □ Cx, Egress URI Set is Sx} is equivalent to multicast forwarding where the multicast group is {message: message □ Cx}.

XML routing involves (1) propagation of topological information to establish the XML overlay network, (2) aggregation of XML constraint subscriptions received from neighbor subscribers, (3) distribution of XML context subscriptions (selection predicates) among XML routers in the XML network overlay, (4) and failure detection and recovery mechanisms. XML routing protocols aim to distribute accurate and current routing information among routers, and achieve loop-free minimal-cost message forwarding paths.

XML Pub-Sub modules may perform either topic-based multicast for predefined multicast channels or content-based multicast for dynamic channels using XPath and XQuery technology.

The VPN Publish-Subscribe multicast service is also complemented by subscription management capabilities that allow the enterprise to specify which classes of subscribers has access to which categories of content.

The invention has many advantages in relation to VPN multicast:

1—OPEX savings: Operational simplicity is achieved with the self-managed multicast capability of XML publish-subscribe technology. XMP publish-subscribe offers automatic creation and destruction of many-to-many channels for group communication without operator or LAN administrator intervention. Simplifying the operational aspect of VPN multicast is important because current solutions (IP VPN multicast) require significant operational and configuration effort to assign multicast addresses, bring multicast channels on line, and then configure applications to use the newly created multicast channel. This aspect makes IP VPN multicast a disruptive technology.

2—Attachment circuit BW efficiency: Using carrier-based VPN Publish-Subscribe multicast service with enterprise publish-subscribe messaging servers allows enterprises to save on bandwidth over the attachment circuit by eliminating the need for customer premise pub-sub servers to replicate messages for multiple sites of the Enterprise network. Attachment circuit bandwidth is typically expensive making this advantage a notable one.

3—Carrier Network Bandwidth Efficiency: Due to the limited number of IP multicast channels in the carrier's network, a multicast channel in the carrier network is typically shared by many customer multicast channels. The sharing of a carrier multicast channel typically results in what is known as "Bandwidth Leakage", the process of sending a multicast packets of a particular channel over a shared carrier channel to an edge router that has no customer channel subscribers attached. XML Pub-Sub multicast offer an infinite number of multicast channels that are easily configured eliminating the need for shared channels and the multicast BW leakage problem 4—System flexibility and adaptability to change. The carrier-based VPN Publish-Subscribe network decouples enterprise sites from each other. Subscribers and publishers from one site need not know about subscribers and publishers in another. This aspect allows enterprise systems to change at one site without having to change the other sites. This aspect is highly valuable for expanding or contracting businesses.

5—Reliable Layer 4 connectivity: XML publish-subscribe modules may use TCP to achieve reliable transfer over lossy links. This option, which is valuable for use with wireless connections (WiMAX), is not available to IP multicast service.

6—Service Reliability: The invention avoids use of complex IP multicast routing protocols and yield simpler and more reliable network nodes and improved network reliability. The invention decouples group membership from the multicast tree structure in the provider domain.

Although particular aspects of the invention have been described and illustrated it will be apparent to one skilled in the art that numerous changes can be implemented without departing from the basic concept. It is to be understood, however, that such changes will fall within the full scope of the invention as defined by the appended claims.

I claim:

1. A method of delivering multicast services between multiple subscribers within a virtual private network (VPN) comprising:

connecting a VPN Provider Edge (PE) router to a publish-subscribe module within the VPN;

maintaining VPN traffic isolation over the VPN PE router connection using unique network identifiers;

associating an independent virtual eXtensible Markup Language (XML) Router (VXMLR) entity on the publish-subscribe module with each VPN;

making the VXMLR reachable from respective customer sites by assigning it one or more Internet Protocol (IP) addresses and host names;

running an XML routing protocol to discover the VXMLR, populate the VXMLR forwarding table with routing entries (Queries), and detecting failures and handling them; and offering XML document forwarding, replication, filtering, transformation, and Quality of Service (QoS) QoS marking as per queries within a VXMLR Virtual Publish Subscribe Network (VPSN) Query Table.

2. The method as defined in claim 1, wherein the VPN is implemented over an Internet Protocol/Multi Protocol Label Switching (IP/MPLS) backbone.

3. The method as defined in claim 1, wherein a XML publish-subscribe service is a topic based multicast for predefined multicast channels.

4. The method as defined in claim 1, wherein a XML publish-subscribe service is a content based multicast for dynamic channels.

5. The method as defined in claim 1, wherein a XML publish-subscribe service for multicast capability is self managed.

6. The method as defined in claim 5, wherein the XML publish-subscribe service offers automatic creation and destruction of many to many channels for group communications.

7. A system for delivering multicast services between multiple subscriber sites over a Virtual Private Network (VPN) comprising:

a network interface having logical port capabilities for connecting to multiple VPN networks and keeping VPN traffic isolated;

multiple virtual XML Router (VXMLR) entities, each VXMLR being associated with the VPN it serves and being capable of processing layer 3, layer 4, layer 5, layer 6, and layer 7;

an independent Virtual Publish-Subscribe Network (VPSN) Query Table populated by each VXMLR;

and a XML Routing Protocol Engine for execution of an XML routing protocol to discover the VXMLR, populate the VXMLR forwarding table with routing entries (Queries), and detecting failures and handling them.

8. The system as defined in claim 7, wherein the VPN is implemented over an IP/MPLS backbone.

9. The system as defined in claim 7, wherein XML publish-subscribe modules are integrated with associated edge routers.

10. The system as defined in claim 7, wherein XML publish-subscribe modules are attached to associated edge routers using Virtual Local Area Network (VLAN) ports and Ethernet technology.

11. The system as defined in claim 7, wherein XML publish-subscribe modules present standardized layer 5 interfaces to customer equipment at customer sites over attachment circuits.

12. The system as defined in claim 7, wherein XML publish-subscribe modules allow subscribers to save on bandwidth by eliminating a need for subscribers' servers to replicate messages for multiple sites.

13. The system as defined in claim 7, wherein publish-subscribe modules provide an infinite number of multicast channels that are easily configured.

14. The system as defined in claim 7, wherein each VXMLR has independent processing, memory, and bandwidth resources.

15. The system as defined in claim 14, wherein each VXMLR forwards, replicates, filters, and transforms published XML documents according to queries within the VPSN Query Table.

16. The system as defined in claim 14, wherein layer 3 is processed with IP.

17. The system as defined in claim 14, wherein layer 4 is processed with a Transmission Control Protocol (TCP) and a User Datagram Protocol (UDP) with Transport Layer Security (TLS).

18. The system as defined in claim 14, wherein layer 5 is processed with one of a HyperText Transfer Protocol (HTTP), a Simple Mail Transfer Protocol (SMTP), a File Transfer Protocol (FTP), and an eXtensible Messaging and Presence Protocol (XMPP).

19. The system as defined in claim 14, wherein layer 6 is processed with one of a Simple Object Access Protocol (SOAP), a Java Message Service (JMS), an Atom Publishing Protocol, Really Simple Syndication (RSS), and XML.

20. The system as defined in claim 14, wherein layer 6 is processed with XML.

* * * * *